United States Patent
Ono (10) Patent No.: US 6,304,931 B1
(45) Date of Patent: Oct. 16, 2001

(54) ACCESS LIMITING BUS CONTROL SYSTEM AND METHOD

(75) Inventor: Noriaki Ono, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 09/182,232

(22) Filed: Oct. 30, 1998

(30) Foreign Application Priority Data

May 12, 1998 (JP) .................................................. 10-129064

(51) Int. Cl.$^7$ ..................................................... G06F 13/00

(52) U.S. Cl. ........................... 710/107; 710/36; 710/126; 710/240

(58) Field of Search ............................... 710/107, 22, 24, 710/126, 128, 129, 240, 36; 711/167, 204, 213, 217, 1, 137

(56) References Cited

U.S. PATENT DOCUMENTS 5,715,421 * 2/1998 Akiyama et al. .................... 365/203
5,860,150 * 1/1999 Chiarot et al. ...................... 711/213

* cited by examiner

Primary Examiner—Ario Etienne
(74) Attorney, Agent, or Firm—Arent Fox Kintner Plotkin & Kahn, PLLC (57) ABSTRACT

In a bus control system for generating a series of access requests from an access requesting unit, such as a CPU connected to a common bus including a data bus or an address bus, to a specific access request responding unit, the specific access request responding unit includes a next-address enable signal generating unit for sending a next-address enable signal which represents that a next address can be received, to the access requesting unit before data is transferred or inputted, in accordance with an address representing the access request from the access requesting unit when a read operation or a write operation is executed. Preferably, the access requesting unit includes a next-address enable signal receiving unit for receiving the next-address enable signal from the specific access request responding unit and for sending the next address to the specific access request responding unit. On the other hand, a bus control method executed by using the bus control system, having the construction described above, is disclosed.

8 Claims, 7 Drawing Sheets

ACCESS LIMITING BUS CONTROL SYSTEM AND METHOD

BACKGROUND OF THE INVENTION

1. Field of the Invention

This invention relates to a bus control system and to a bus control method that do not permit an access request, to other arbitrary access request responding units, during a period from an access request from an access requesting unit, such as a microprocessor or a CPU (Central Processing Unit) connected to a common bus including a data bus or an address bus, to a specific access request responding unit, until a completion of the access request.

The common bus applied to such a bus control system is generally referred to as a "non-split bus". When a read operation of data and a write operation of data are executed between an access requesting unit, such as a CPU (Central Processing Unit) connected to this non-split bus, and access request responding units such as a memory and an I/O, the present invention pertains to one technique for improving, as much as possible, the utilization efficiency of the non-split bus.

2. Description of the Related Art

A read operation of a bus control system according to the prior art will be explained hereby with reference to FIG. 1, that will be described later in "Brief Description of the Drawings", in order to demonstrate the problems encountered when a read operation of data and a write operation of data are executed in conventional bus control systems using a non-split bus.

However, in this case, it is assumed that a conventional bus control system of a type in which a CPU having the function of generating a series of access requests (i.e., an access requesting unit) and a memory and an I/O for inputting and outputting the data in response to the access request from the CPU (i.e., access request responding units), are connected to a common bus of a non-split type including the data bus or the address bus described above.

Figure 1:
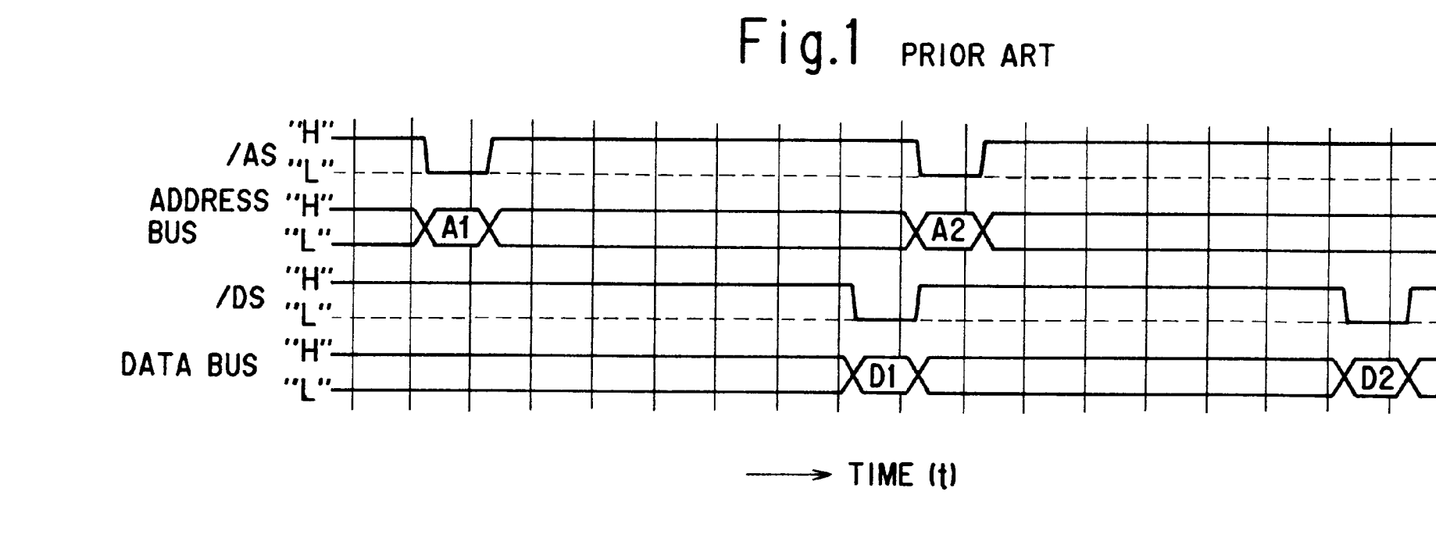
FIG. 1 is a timing chart useful for explaining a read operation of a bus control system according to the prior art.

In FIG. 1, a timing chart useful for explaining the read operation of the conventional bus control system is illustrated. This timing chart shows only those signals which are necessary for transferring the data between the CPU, and the memory and the I/O.

When the read operation of data is executed (i.e., at the time of the read operation of data), the CPU on the data read requesting side outputs an address (A1) on the address bus and an address strobe signal /AS (where "/AS" represents a signal of a negative logic). Either one of the memory and the I/O on the responding side to the data read request from the CPU receives the address (A1) described above, and outputs the data (D1) on the data bus and the data strobe signal /DS (where "/DS" represents a signal of a negative logic) at the time when the output of the data (D1) becomes feasible. Incidentally, the address strobe signal /AS and the data strobe signal /DS each having a negative logic become an active state (become effective) at an "L (low)" level, that is, at a low voltage level, and become an inactive state at a "H (high)" level, that is, at a high voltage level. Further, the CPU reads the data (D1) from the data bus at the time when the data strobe signal /DS becomes effective.

Thereafter, the CPU on the data read requesting side outputs the next address (A2) on the address bus and outputs the address strobe signal /AS. Either one of the memory and the I/O on the responding side to the data read request from the CPU receives the address (A2), outputs the data (D2) on the data bus at the time when the output of the next data (D2) becomes feasible, and outputs the data strobe signal /DS. Further, the CPU reads the data (D2) from the data bus at the time when the data strobe signal /DS becomes feasible. A series of these sequences concerning the read operation are executed until the data read request from the CPU is finished.

When the write operation of data is executed (i.e., at the time of the write operation of data, which is not shown in the drawing), on the other hand, the CPU on the data write requesting side outputs the address on the address bus and also outputs the address strobe signal /AS. Either one of the memory and the I/O on the responding side to the data write request from the CPU receives the address and outputs the data strobe signal /DS at the time when the input of the data described above becomes feasible. Further, the CPU outputs the data in response to the data strobe signal /DS, and either one of the memory and the I/O receives and inputs the data.

Thereafter, the CPU on the data write requesting side outputs the next address to the address bus and outputs the address strobe signal /AS. Either one of the memory and the I/O on the responding side to the data write request from the CPU receives the address and outputs the data strobe signal /DS at the time when the input of the next data becomes feasible. Further, the CPU outputs the next data in response to the data strobe signal /DS. A series of these processes concerning the write operation are executed until the data write request from the CPU is finished.

In both of the read and write operations described above, the time which has elapsed from the output of the address strobe signal /AS from the CPU till the return of the data strobe signal to the CPU, corresponds to the processing time inside the memory and the I/O on the responding side to the data read request and the data write request.

As described above, when the read and write operations of data are executed in the conventional bus control system, the next data read request and the next data write request cannot be generated until the CPU on the access requesting side outputs the address strobe signal and then receives the data strobe signal. For this reason, the utilization efficiency of the bus becomes low. In other words, even though a control circuit inside the memory or the I/O on the responding side to the access request enters into the state in which it can execute an addressing process for responding to the next access request in a period from the output of the address strobe signal until the output of the data strobe signal, wasted time or latency corresponding to the above period occurs because the address for the next access request does not arrive at the control circuit.

SUMMARY OF THE INVENTION

The present invention has been conceived of in view of the problems described above, and is directed to improving the utilization efficiency of the bus by reducing as much as possible the wasted time occurring when the address for the next access request from the CPU, etc., on the access requesting side does not arrive at the memory and the I/O or the like.

To solve the problems described above, a bus control system according to the present invention is constituted so as to include one access requesting unit connected to a common bus including a data bus or an address bus; and a plurality of access request responding units for responding to an access request from this access requesting unit, and constituted so as not to permit an access request to other arbitrary access request responding units, in a period from an access request to a specific access request requesting unit from the access requesting unit, until a completion of the access request. In such a configuration, when a read operation is executed, the specific access request responding unit includes a next-address enable signal generating unit for sending a next-address enable signal, which represents that the next address can be received, to the access requesting unit before data is transferred to the data bus, in accordance with an address representing the access request from the access requesting unit.

Preferably, the access requesting unit in the bus control system according to the present invention includes a next-address enable signal receiving unit for receiving the next-address enable signal from the specific access request responding unit and for sending the next address to the specific access request responding unit.

Further, the bus control system according to the present invention is constituted so as to include one access requesting unit connected to a common bus including a data bus or an address bus; and a plurality of access request responding units for responding to an access request from this access requesting unit, and constituted so as not to permit an access request to other arbitrary access request responding units in a period from an access request to a specific access request responding unit from the access requesting unit, until a completion of the access request. In such a configuration, when a write operation is executed, the specific access request responding unit includes a next-address enable signal generating unit for sending a next-address enable signal, which represents that the next address can be received, to the access requesting unit before data transferred from the access requesting unit to the data bus is inputted, in accordance with an address representing the access request from the access requesting unit.

On the other hand, a bus control method according to the present invention does not permit an access request to other arbitrary access request responding units in a period from an access request to a specific access request responding unit from one access requesting unit connected to a common bus including a data bus or an address bus, until a completion of the access request. In such a method, when a read operation is executed, a next-address enable signal representing that a next address can be received is sent from the specific access request responding unit to the access requesting unit before data is transferred from the specific access request responding unit to the data bus, in accordance with an address representing the access request from the access requesting unit.

Preferably, in the bus control method according to the present invention, the next address is sent from the access requesting unit to the specific access request responding unit after the next-address enable signal, from the specific access request responding unit, is received.

Further, a bus control method according to the present invention does not permit an access request to other arbitrary access request responding units in a period from an access request to a specific access request responding unit from one access requesting unit connected to a common bus including a data bus or an address bus, until a completion of the access request. In such a method, when a write operation is executed, a next-address enable signal representing that a next address can be received is sent from the specific access request responding unit to the access requesting unit before data transferred from the access requesting unit to the data bus is inputted, in accordance with an address representing the access request from the access requesting unit.

As described above, in the bus control system and the bus control method according to the present invention, the next-address enable signal representing that the next address can be received (that is, an acknowledge signal ACK representing that the address can be received) is returned to the access requesting unit on the access requesting side (for example, the CPU), after the access request responding unit on the responding side to the access request (for example, the memory and the I/O) receives the address.

Further, in the bus control system and the bus control method according to the present invention, the access requesting unit that receives the next-address enable signal outputs the address for the request for the next data access. In other words, since the access request responding unit returns the next-address enable signal in this case, the access requesting side can output the address for the next access request.

In summary, the present invention can reduce the wasted time which occurs because the address for the next access request does not arrive at the responding side to the access request from the access requesting side, much more than in the conventional bus control systems and methods by outputting the next-address enable signal from the responding side to the access request. Therefore, the present invention can shorten the access time and can improve the utilization efficiency of the bus.

BRIEF DESCRIPTION OF THE DRAWINGS

The above object and features of the present invention will be more apparent from the following description of the preferred embodiments with reference to the accompanying drawings, wherein.

DESCRIPTION OF THE PREFERRED EMBODIMENTS

Hereinafter, a basic embodiment and preferred embodiments of the present invention will be explained in detail, with reference to FIGS. 2 to 9 of the accompanying drawings.

Figure 2:
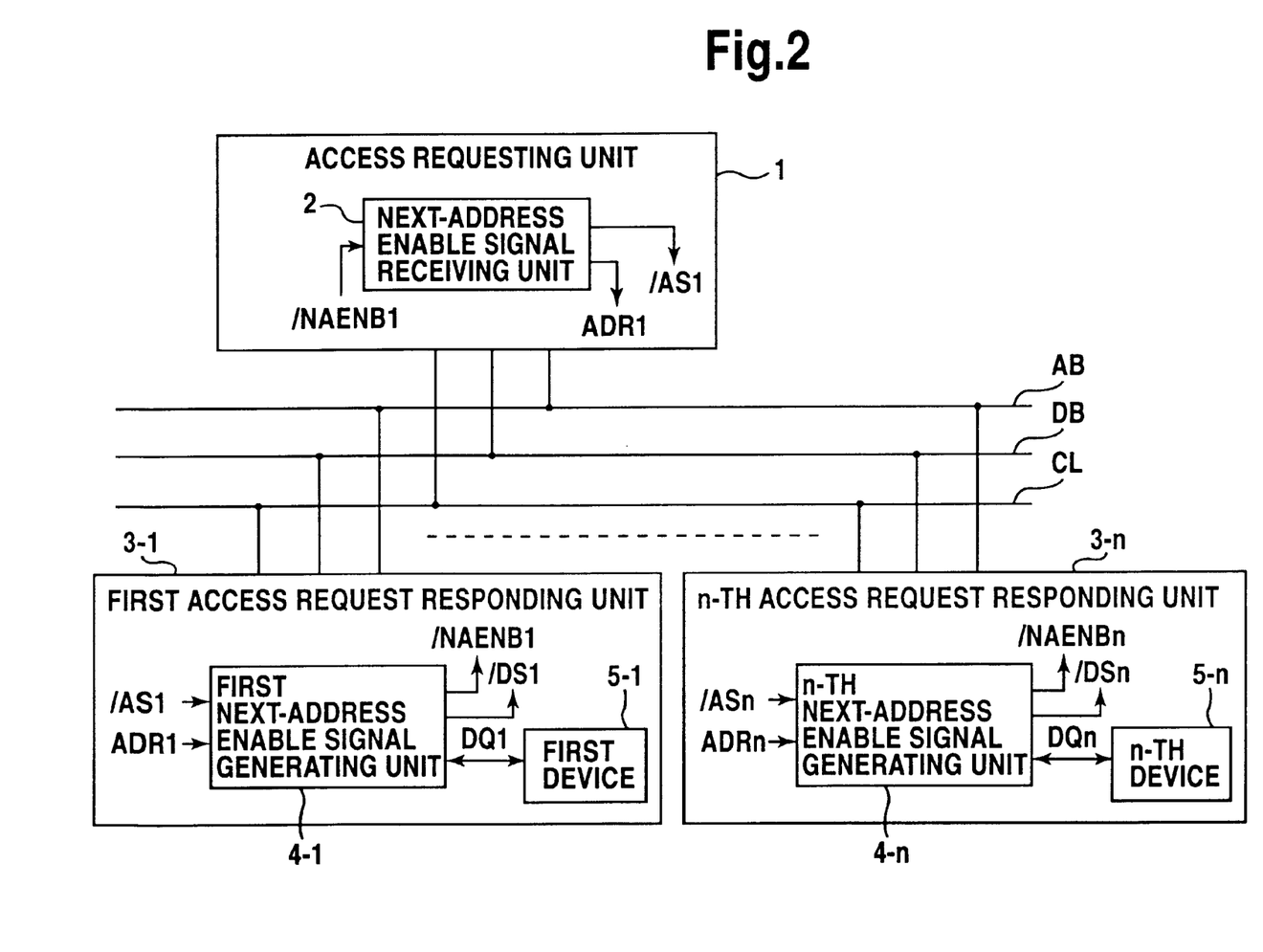
FIG. 2 is a block diagram showing the construction of a basic embodiment based on the principle of the present invention.

FIG. 2 is a block diagram showing the construction of the basic embodiment based on the principle of the present invention. In this drawing, however, the construction of a bus control system according to the basic embodiment of the invention is illustrated in a simplified form.

Referring to FIG. 2, there is shown disposed a common bus of a non-split bus type including a data bus DB for transferring data DQ (for example, DQ1 to DQn) or an address bus AB for transferring an address ADR (for example, ADR1 to ADRn). Further, a control signal line CL for transferring various control signals, such as an address strobe signal /AS and a data strobe signal /DS, is disposed, too.

In FIG. 2, further, one access requesting unit 1 connected to the common bus including the data bus DB or the address bus AB, and a plurality of access request responding units 3-1 to 3-n (where n is an arbitrary positive integer of 2 or more than 2) responding to the access request from this access requesting unit 1, are also provided. Because the bus of a non-split bus type is used in this case, the access request to other arbitrary access request responding units (for example, the n-th access request responding unit 3-n) is not permitted in a period from the access request to a specific access request responding unit (for example, the first access request responding unit. 3-1) from the access requesting unit 1, until a completion of the access request.

To solve the problems described above, the specific access request responding unit 3-1 in the bus control system according to the present invention is provided with a next-address enable signal generating unit (for example, the first next-address enable signal generating unit 4-1) for sending a next-address enable signal /NAENB1 (where "/NAENBl" represents a signal of a negative logic) which represents that the next address can be received, to the access requesting unit 1 before the data DQ1 is transferred to the data bus DB, in accordance with the address ADR1 representing the access request from the access requesting unit 1, when the read operation is executed, as shown in FIG. 2. The data DQ1 is held by a first device 5-1 and is outputted, together with the data strobe signal /DS1, when the address ADR1 and the address strobe signal /AS1 are inputted.

Preferably, the access requesting unit 1 in the bus control system shown in FIG. 2 is provided with a next-address enable signal receiving unit 2 for receiving the next-address enable signal /NAENB1 from the specific access request responding unit 3-1 and for sending the next address to the specific access request responding unit 3-1. In this case, while the access requesting unit 1 exchanges the data with the specific access request responding unit 3-1, the access requesting unit 1 cannot transfer the address ADRn and the address strobe signal /ASn to the n-th address enable signal generating unit 4-n of the n-th access request responding unit 3-n which is one example of other arbitrary access request responding units, and can receive neither the next-address enable signal /NAENBn (where "/NAENBn" represents a signal of a negative logic) and the data strobe signal /DSn from the n-th next-address enable signal generating unit 4-n, nor the data DQn from the n-th device 5-n.

To execute the write operation, on the other hand, the specific access request responding unit 3-1 is provided with a next-address enable signal generating unit (for example, first next-address enable signal generating unit 4-1) for sending the next-address enable signal /NAENB1 which represents that the next address can be received, to the access requesting unit 1 before the data transferred from the access requesting unit 1 to the data bus DB is inputted, in accordance with the address ADR1 representing the access request from the access requesting unit 1. In other words, the next-address enable signal generating unit 4-1 has the function of sending the next-address enable signal /NAENB1 representing that the next address can be received, when either of the read operation and the write operation is executed.

When the read operation is executed in the bus control method executed by using the bus control system shown in FIG. 2, the specific access request responding unit sends to the access requesting unit the next-address enable signal representing that the next address can be received, before the data is transferred from the specific access request responding unit to the data bus, in accordance with the address representing the access request from the access requesting unit.

Preferably, in the bus control method described above, the next address is sent from the access requesting unit to the specific access request responding unit after the next-address enable signal, from the specific access request responding unit, is received.

Preferably, further, in order to execute the write operation in the bus control method described above, the next-address enable signal representing that the next address can be received is sent from the specific access request responding unit to the access requesting unit before the data transferred from the access requesting unit to the data bus is inputted, in accordance with the address representing the access request from the access requesting unit.

In other words, in the bus control system and in the bus control method according to the basic embodiment of the present invention, the next-address enable signal representing that the next address can now be received (that is, an acknowledge signal ACK representing that the address can be received) is returned to the access requesting unit on the access requesting side (for example, a CPU) after the access request responding unit on the responding side to the access request (for example, a memory or an I/O) receives the address.

When the read operation of data is executed, the access request responding unit first receives the address and then executes the read operation from the device. However, in general, a predetermined access time is necessary for reading the data from the device. If the addressing process for the next data access can be carried out during a latency corresponding to the access time, the access time for the next data access can be shortened. In the bus control system and the bus control method according to the basic embodiment of the present invention, the next-address enable signal is outputted so that the next address can be received during the latency described above.

When the write operation of data is executed, too, the access request responding unit first receives the address and then activates the data write sequence for the device. Further, at the time when the address for the next data write request becomes receivable, the next-address enable signal is outputted.

In the bus control system and the bus control method according to the basic embodiment of the present invention, further, the access requesting unit receiving the next-address enable signal outputs the address for the next access request. In other words, in this case, the access request responding unit returns the next-address enable signal to the access requesting unit and in this way, the access requesting side can output the address for the next access request.

On the other hand, because the access request responding unit can start in advance the next data access process by using the address described above, the processing time for the next data access can be started at the earlier timing.

Finally, in the bus control system and the bus control method according to the basic embodiment of the present invention, the responding side to the access request outputs the next-address enable signal and in this way, the wasted time that occurs because the address for the next access request does not arrive at the responding side from the access requesting side can be reduced much more than in the conventional systems and methods. Therefore, the access time can be shortened and the utilization efficiency of the bus can be improved.

Figure 3:
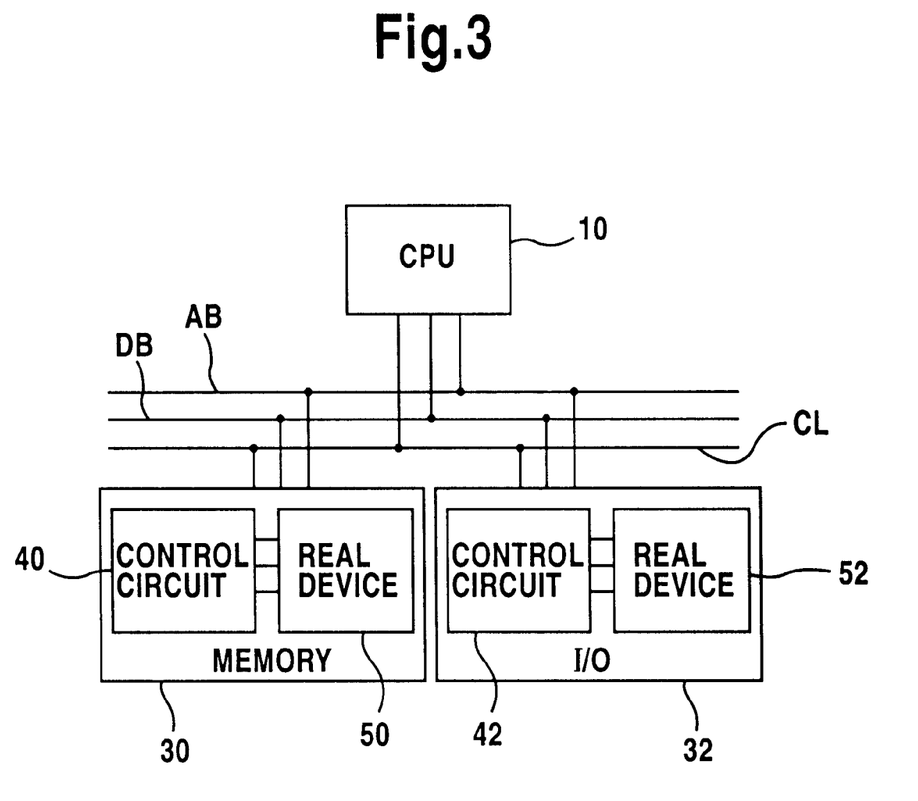
FIG. 3 is a block diagram showing the construction of a preferred embodiment of the present invention.

FIG. 3 is a block diagram showing the construction of a preferred embodiment of the present invention. Incidentally, like reference numerals or symbols will be used hereinafter to identify like constituent elements that already have been explained.

In the embodiment shown in FIG. 3, the common bus of a non-split type including the data bus DB for transferring the data or the address bus AB for transferring the address is disposed. Further, there is also disposed the control signal line CL for transferring various control signals, including the address strobe signal, the data strobe signal, the next-address enable signal, and so forth.

In the embodiment shown in FIG. 3, the CPU 10 functioning as the access requesting unit 1 (see FIG. 2) is connected to the data bus DB, the address bus AB and the control signal line CL. Further, the memory 30 and the I/O 32 functioning as the access request responding units 3-1 to 3-n are also connected to the data bus DB, the address bus AB and the control signal line CL.

The next-address enable signal generating unit (see FIG. 2) which is one of constituent elements characteristic of the present invention is embodied by the control circuit 40 inside the memory 30 shown in FIG. 3 and the control circuit 42 inside the I/O 32. These memory 30 and I/O 32 include a real device 50 and a real device 52 for reading and writing the data, respectively. Further, the next-address enable signal receiving unit (see FIG. 2) which is another constituent element characteristic of the present invention is contained in the CPU 30.

Figure 4:
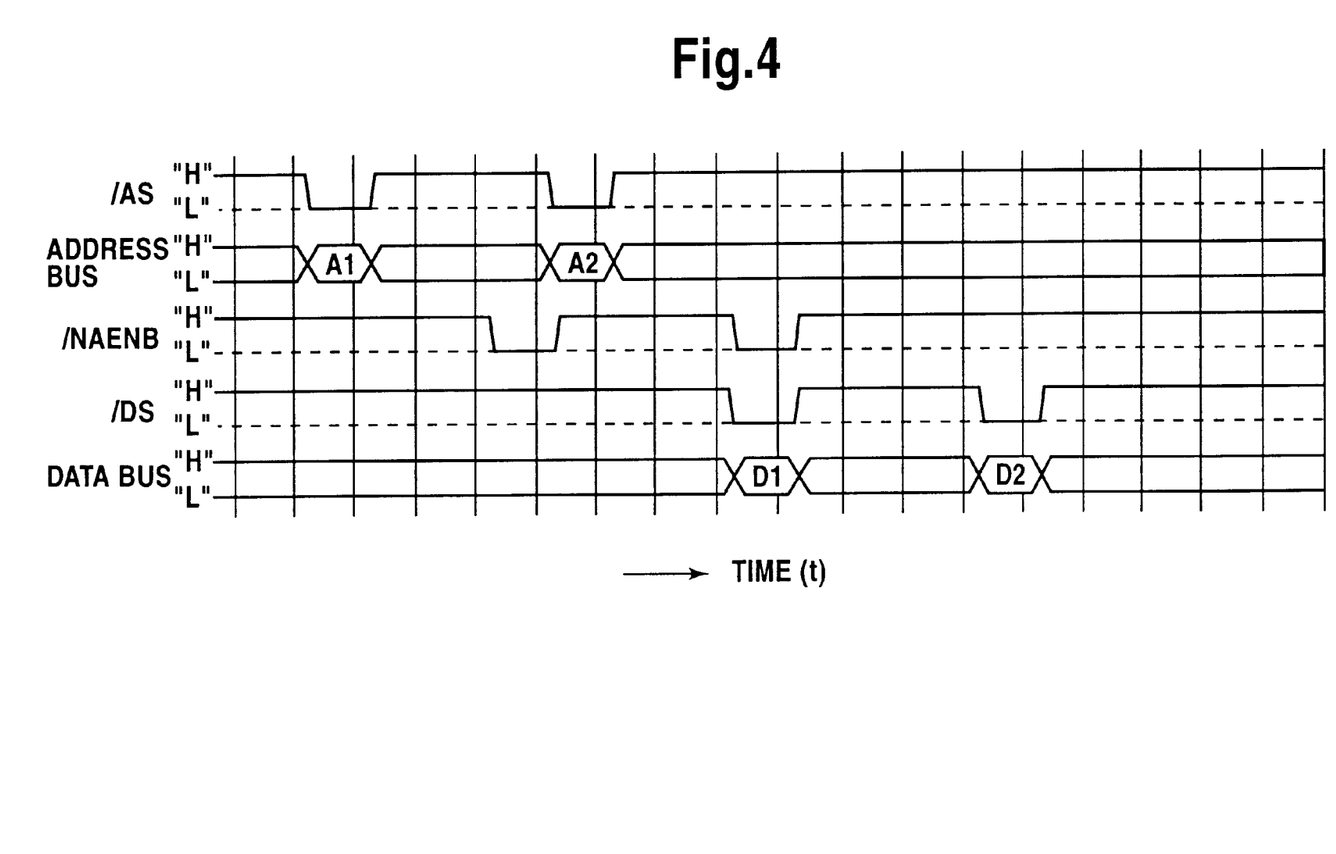
FIG. 4 is a timing chart useful for explaining a read operation of the embodiment shown in FIG. 3.
Figure 5:
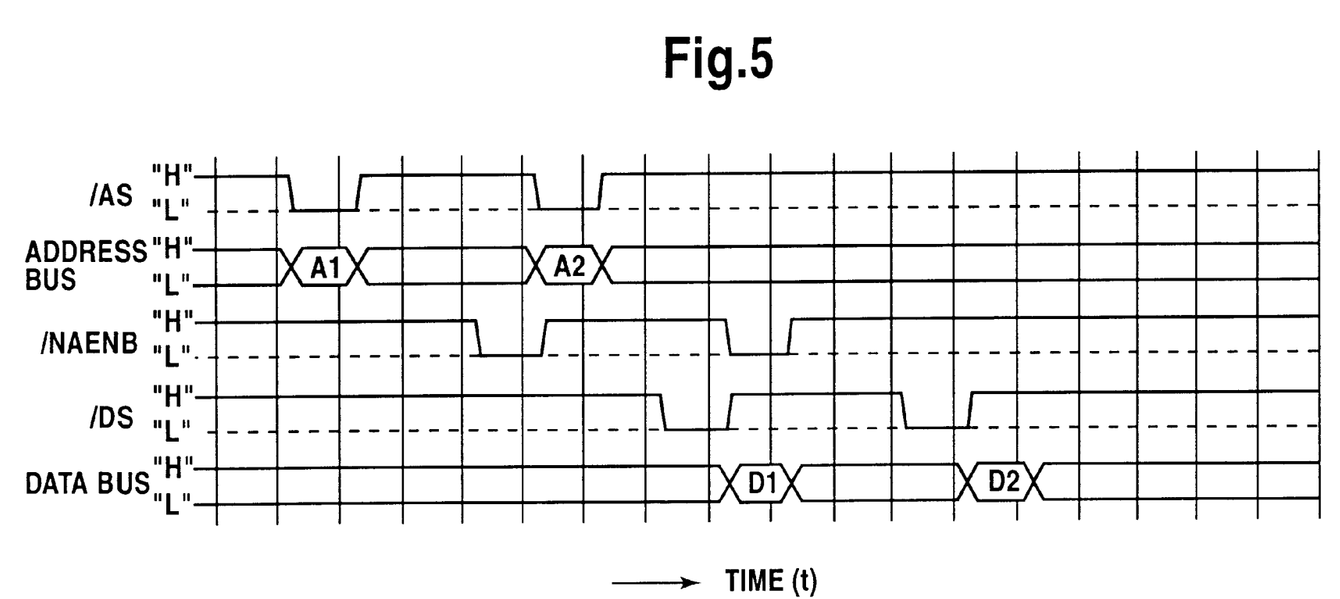
FIG. 5 is a timing chart useful for explaining a write operation of the embodiment shown in FIG. 3.

FIG. 4 is a timing chart useful for explaining the read operation of the embodiment shown in FIG. 3, and FIG. 5 is a timing chart useful for explaining its write operation.

When the read operation is carried out in the embodiment shown in FIG. 3, the CPU first outputs the address ADR(A1) with the "L" level address strobe signal /AS to the memory or to the I/O, and then generates the data read request. Next, when receiving the "L" level address strobe signal /AS, the control circuit inside the memory or the I/O starts the data read sequence from the real device. Further, the memory or the I/O outputs the "L" level next-address enable signal /NAENB to the CPU during this data read sequence at the time when the memory or the I/O becomes the state in which the address ADR(A2) for the next data access process can be received. When detecting the "L" level next-address enable signal /NAENB, the CPU outputs the address ADR(A2) for the next address access process, together with the address strobe signal /AS. While the memory or the I/O receives the address ADR(A2) transferred from the address bus, the memory or the I/O starts the data read sequence from the real device. The data DQ (D1, D2, . . . ) are outputted to the data bus, together with the data strobe signal /DS, in the order of the data read request. The CPU on the data access requesting side detects the "L" level data strobe signal /DS and inputs the data DQ from the data bus. A series of these processes are repeated until the next data access request does not continue.

When the write operation is carried out in the embodiment shown in FIG. 3, on the other hand, the CPU first outputs the address ADR(A1), together with the address strobe signal /AS, to the memory or to the I/O, and then generates the data write request. Next, when receiving the output of the address strobe signal /AS, the control circuit inside the memory or the I/O starts the data write sequence to the real device. Further, the memory or the I/O outputs the "L" level next-address enable signal /NAENB to the CPU during this data write sequence at the time when the memory or the I/O becomes the state in which the address ADR (A2) for the next data access process can be received. When detecting the "L" level next-address enable signal /NAENB, the CPU outputs the address ADR (A2) for the next data write process, together with the address strobe signal /AS. While the memory or the I/O receives the address ADR (A2) transferred from the address bus on one hand, the memory or the I/O starts the data write sequence to the real device. The memory or the I/O outputs the data strobe signal /DS when the memory or the I/O becomes the state in which the data can be received. When detecting the data strobe signal /DS, the CPU outputs the data DQ (D1, D2, . . . ) and the memory or the I/O inputs the data. A series of these processes are repeated until the next data write request does not continue.

Preferably, in the bus control method for executing the read operation by operating the preferred embodiment described above, the next-address enable signal that represents that the next address can be received is sent from the memory or the I/O to the CPU before the data is transferred from the memory or the I/O to the data bus, in accordance with the address representing the data read request from the CPU.

Further preferably, in the bus control method described above, the CPU sends the next address to the memory or the I/O after it receives the next-address enable signal from the memory or the I/O.

Further preferably, in the bus control method for executing the write operation by operating the embodiment described above, the next-address enable signal that represents that the next address can be received is sent from the memory or the I/O to the CPU before the data transferred from the memory or the I/O is inputted, in accordance with the address representing the data write request from the CPU.

Figure 6:
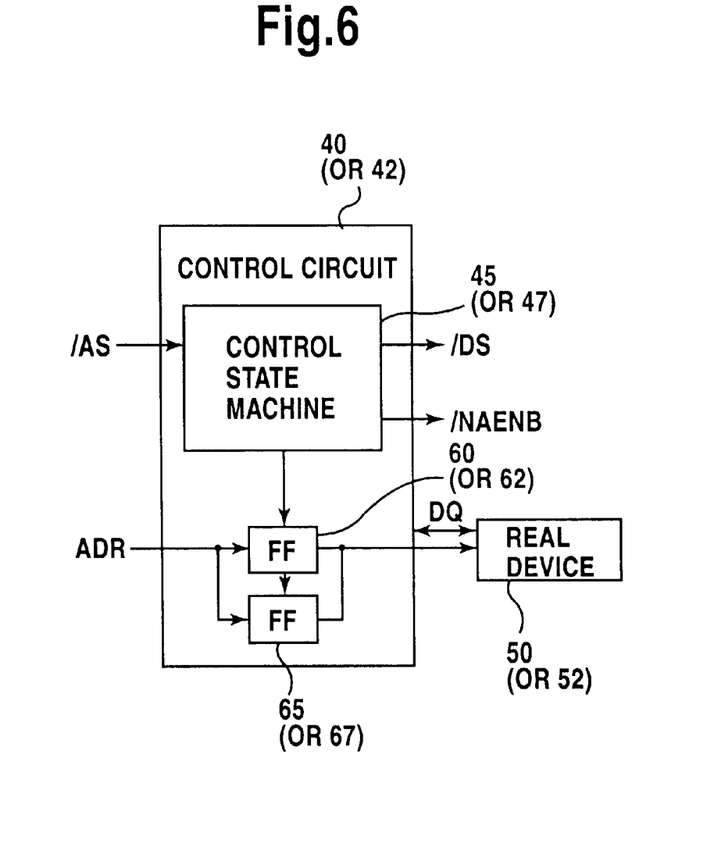
FIG. 6 is a block diagram showing an example of a concrete construction of a control circuit shown in FIG. 3.

FIG. 6 is a block diagram showing a concrete construction example of the control circuit shown in FIG. 3. Since the construction of the control circuits 40 inside the memory shown in FIG. 3 is the same as the construction of the control circuit 42 inside the I/O shown in FIG. 3, the control circuit of either one of these control circuits 40 and 42 will be illustrated as a typical circuit.

Referring to FIG. 6, the control circuit 40 (or 42) inside the memory (or the I/O) includes a control state machine 45 (or 47) for transferring the next-address enable signal /NAENB to the CPU before the data strobe signal /DS is outputted after the address strobe signal /AS is inputted, and two flip-flops (FF) 60 and 65 (or 62 and 67) for receiving the address ADR and sending the same to the real device 50 (or 52), the two flip-flops 60 and 65 being connected in parallel with each other.

The control state machine 45 transfers the next-address enable signal /NAENB to the CPU when the control state machine becomes the state in which the address ADR for the data access process can be received after a predetermined time has elapsed from the input of the address strobe signal /AS. The flip-flops 60 and 65 operate at this time so that they can receive the next address ADR sent from the CPU. In other words, the flip-flops receive the address for the next data access process when they enter into the state in which they can execute the address process for the next access request, within a period from the reception of the address strobe signal /AS until the output of the data strobe signal /DS (that is, during a latency). In this way, the access time can be shortened.

Figure 7:
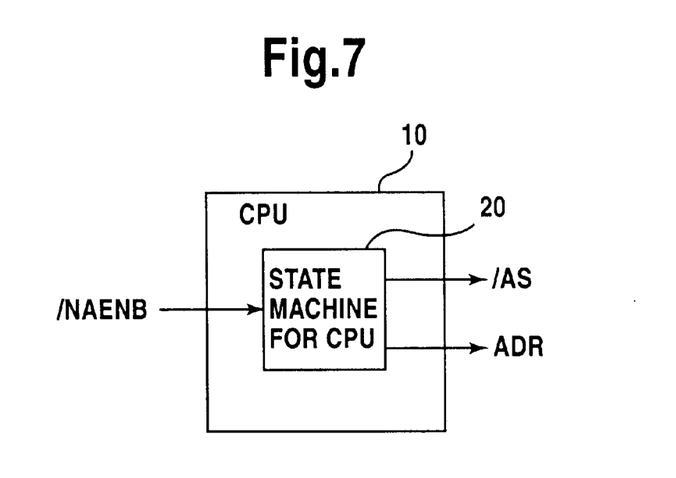
FIG. 7 is a block diagram showing an example of a concrete construction of a CPU shown in FIG. 3.

FIG. 7 is a block diagram showing a concrete construction example of the CPU shown in FIG. 3. In this drawing, a state machine 20 for a CPU, which functions as the aforementioned next-address enable signal receiving unit (see FIG. 2), is disposed inside the CPU 10.

Referring to FIG. 7, the state machine 20 for a CPU receives the next-address enable signal /NAENB sent from the control state machine 45 (see FIG. 6), then outputs the address ADR for the next data access process and outputs the corresponding address strobe signal /AS. The address ADR is inputted to the two flip-flops (FF) 60 and 65 inside the control circuit 40 through the address bus, and the address strobe signal /AS is inputted to the control state machine 45 inside the control circuit 40.

Figure 8:
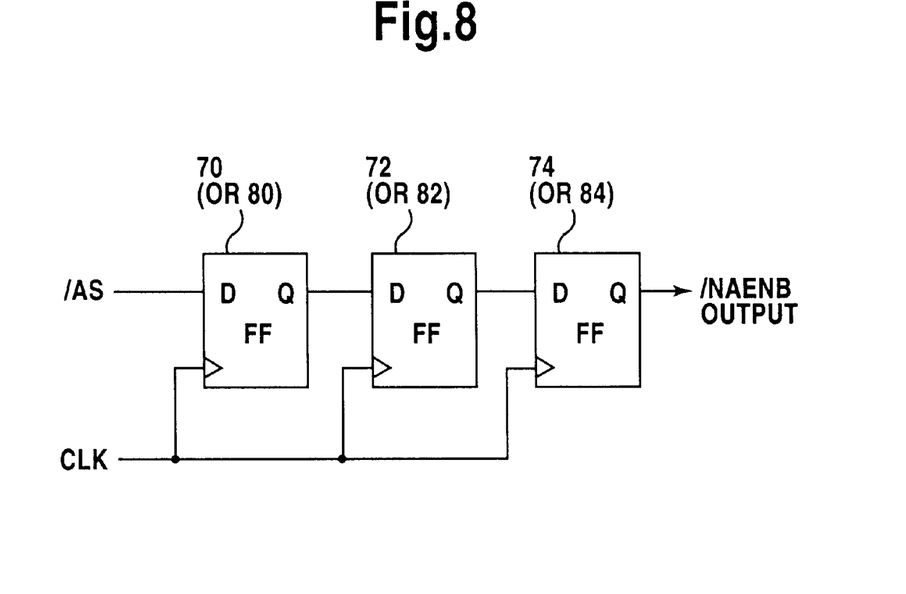
FIG. 8 is a block circuit diagram showing an example of a concrete construction of a next-address enable signal outputting unit of a control state machine shown in FIG. 6.

FIG. 8 is a block circuit diagram showing a concrete construction example of the next-address enable signal outputting unit of the control state machine shown in FIG. 6.

As shown in FIG. 8, the outputting unit for outputting the next-address enable signal /NAENB inside the control state machine 45 (or 47) comprises three stages of D flip-flops (D-FF) 70, 72 and 74 (or 80, 82 and 84). These D flip-flops operate in synchronism with the clock signal CLK and output the next-address enable signal /NAENB after the predetermined delay time from the output of the address strobe signal /AS (for example, by three clock cycles). The number of stages of these D flip-flops is changed in accordance with the time for processing the data inside the memory or the I/O and in this way, the set value corresponding to the predetermined delay time by these D flip-flops can be changed appropriately.

Figure 9:
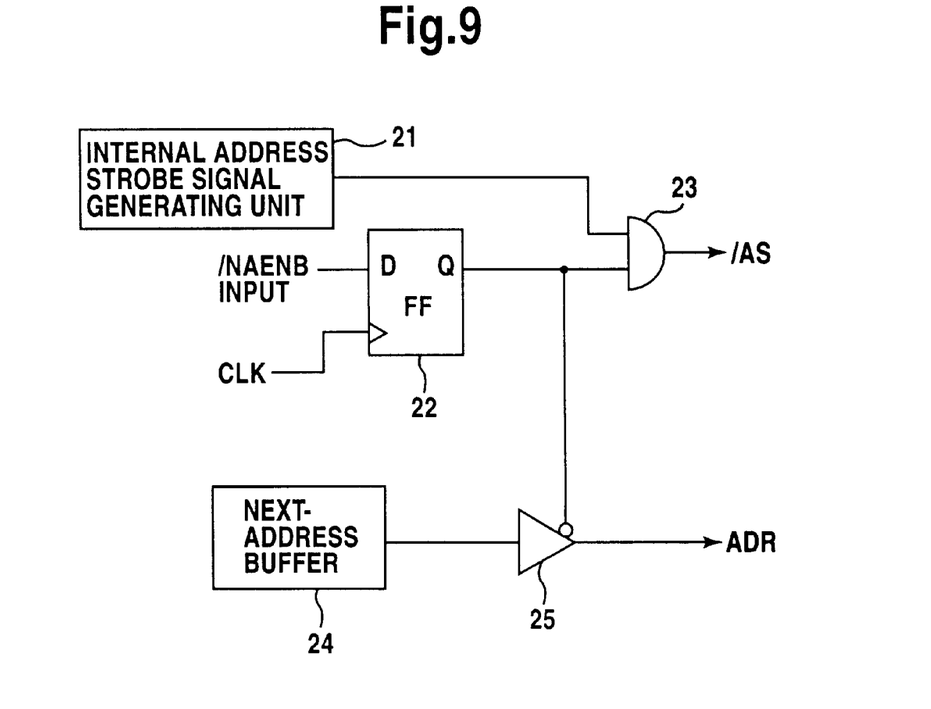
FIG. 9 is a block circuit diagram showing an example of a concrete construction of a next-address enable signal inputting unit of a state machine for a CPU shown in FIG. 7.

FIG. 9 is a block circuit diagram showing a concrete construction example of the next-address enable signal inputting unit of the state machine for a CPU shown in FIG. 7.

As shown in FIG. 9, the above inputting unit for inputting the next-address enable signal /NAEMB inside the state machine 20 for a CPU includes an internal address strobe signal generating unit 21 for generating an internal address strobe signal /AS; a D flip-flop (D-FF) 22 for latching the thus inputted next-address enable signal /NAENB in synchronism with the clock signal CLK; and an AND gate 23 for outputting the address strobe signal /AS to the control circuit on the basis of the first output signal from the internal address strobe signal generating unit 21 and the second output signal from the D flip-flop 22.

Further, the above inputting unit for inputting the next-address enable signal /NAENB includes a next-address buffer 24 for sending the next address ADR; and a next-address output gate 25 for ouputting the next address ADR to the control circuit in accordance with the output signal of the D flip-flop 22.

Referring to FIG. 9, the inputting unit of the state machine 20 for a CPU enables to output the address strobe signal /AS through the D flip-flop 22 and through the AND gate 23 when the next-address enable signal /NAENB is inputted, and to output the next address ADR through the next-address buffer 24 and the next-address output gate 25.

As explained above, in the bus control system and the bus control method according to typical embodiments of the present invention, in the first place, it is possible to return the next-address enable signal representing that the next address can be received, to the access requesting side before the responding side to the access request receives the address and transfers the data, when the data read operation is executed. Therefore, the overall response time of the bus in the read operation can be shortened, and the utilization efficiency of the bus can be improved.

In the second place, in the bus control system and the bus control method according to typical embodiments of the present invention, it is possible to output the address for the next access request after the access requesting side receives the next-address enable signal when the data read operation is executed. Therefore, the waste time or latency that occurs because the address for the next access request does not arrive at the responding side to the access request from the access requesting side during the read operation becomes shorter than in the conventional systems and methods, and the utilization efficiency of the bus can be improved.

In the third place, in the bus control system and the bus control method according to typical embodiments of the present invention, it is possible to return to the data write requesting side the next-address enable signal representing that the next address can be received, to the data write requesting side before the responding side to the data write request inputs the data after receiving the address when the data write operation is executed. Therefore, the overall response time of the bus during write operation can be shortened, and the utilization efficiency of the bus can be improved.

In the fourth place, in the bus control system and the bus control method according to typical embodiments of the present invention, it is possible to output the address for the next data write request after the data write requesting side receives the next-address enable signal when the data write operation is executed. Therefore, the wasted time or latency that occurs because the address for the next data write request does not arrive at the responding side to the access request from the data write requesting side during the write operation becomes shorter than in the conventional systems and methods, and the utilization efficiency of the bus can be improved.

What is claimed is:

1. A bus control system comprising:
   an access requesting unit connected to a common bus that includes a data bus or an address bus; and
   a plurality of access request responding units for responding to an access request from said access requesting unit,
   wherein after a first access request has been sent to a first access request responding unit, said access requesting unit prohibits an additional access request from being sent to a second access request responding unit, until completion of said first access request, and
   wherein, when a read operation is executed, said first access request responding unit includes a next-address enable signal generating unit for sending a next-address enable signal which indicates that a next address can be received, to said access requesting unit before data is transferred to said data bus, in accordance with an address representing said first access request from said access requesting unit.

2. A bus control system according to claim 1, wherein said access requesting unit includes a next-address enable signal receiving unit for receiving said next-address enable signal from said first access request responding unit and for sending the next address to said first access request responding unit.

3. A bus control system comprising:

an access requesting unit connected to a common bus that includes a data bus or an address bus; and a plurality of access request responding units for responding to an access request from said access requesting unit, wherein after a first access request has been sent to a first access request responding unit, said access requesting unit prohibits an additional access request from being sent to a second access request responding unit, until completion of said first access request, and wherein, when a read operation is executed, said first access request responding unit includes a next-address enable signal generating unit for sending a next-address enable signal which indicates that a next address can be received, to said access requesting unit before data transferred from said access requesting unit to said data bus is inputted, in accordance with an address representing said first access request from said access requesting unit.

4. A bus control system according to claim 3, wherein said access requesting unit includes a next-address enable signal receiving unit for receiving said next-address enable signal from said first access request responding unit and for sending the next address to said first access request responding unit.

5. A bus control method for prohibiting a second access request from being sent to a second access request responding unit until completion of a first access request by a first access request responding unit, an access requesting unit controls said first and second access request responding units and is connected to a common bus that includes a data bus or an address bus, said method comprising:

sending a next-address enable-signal that indicates that a next address can be received from said first access request responding unit to said access requesting unit; and thereafter transferring data from said first access request responding unit to said data bus, in accordance with an address representing said first access request from said access requesting unit.

6. A bus control method according to claim 5, wherein the next address is sent from said access requesting unit to said first access request responding unit after said next-address enable signal, from said first access request responding unit, is received.

7. A bus control method for prohibiting a second access request from being sent to a second access request responding unit until completion of a first access request by a first access request responding unit, an access requesting unit controls said first and second access request responding units and is connected to a common bus that includes a data bus or an address bus, said method comprising:

sending a next-address enable-signal that indicates that a next address can be received from said first access request responding unit to said access requesting unit; and thereafter transferring data from said access requesting unit to said data bus, in accordance with an address representing said first access request from said access requesting unit.

8. A bus control method according to claim 7, wherein the next address is sent from said access requesting unit to said first access request responding unit after said next-address enable signal, from said first access request responding unit, is received.

* * * * *